US012661749B2

(12) United States Patent
Hu et al.

(10) Patent No.: US 12,661,749 B2
(45) Date of Patent: Jun. 23, 2026

(54) LOADING AND UNLOADING FOR AUTOMATIC GUIDED VEHICLE

(71) Applicant: ABB Schweiz AG, Baden (CH)

(72) Inventors: Funing Hu, Shanghai (CN); Dong Wu, Shanghai (CN)

(73) Assignee: ABB SCHWEIZ AG, Baden (CH)

(*) Notice: Subject to any disclaimer, the term of this patent is extended or adjusted under 35 U.S.C. 154(b) by 309 days.

(21) Appl. No.: 17/755,403

(22) PCT Filed: Nov. 13, 2019

(86) PCT No.: PCT/CN2019/118076
§ 371 (c)(1),
(2) Date: Apr. 28, 2022

(87) PCT Pub. No.: WO2021/092800
PCT Pub. Date: May 20, 2021

(65) Prior Publication Data
US 2023/0002176 A1      Jan. 5, 2023

(51) Int. Cl.
*B23Q 7/14*          (2006.01)
*B65G 67/02*        (2006.01)
(Continued)

(52) U.S. Cl.
CPC ........... *B23Q 7/1442* (2013.01); *B65G 67/02* (2013.01); *B65G 69/006* (2013.01);
(Continued)

(58) Field of Classification Search
CPC .... B65G 67/02; B65G 69/006; B65G 1/0435; B23Q 7/1442; G05B 2219/41104–41107
(Continued)

(56) References Cited

U.S. PATENT DOCUMENTS 4,007,846 A * 2/1977 Pipes ................... B65G 1/0435
                                                          414/280
4,538,950 A * 9/1985 Shiomi ................ B23Q 7/1426
                                                          414/351
(Continued)

FOREIGN PATENT DOCUMENTS

CN          105692096 A       6/2016
CN          107336962 A      11/2017
(Continued)

OTHER PUBLICATIONS

International Search Report and Written Opinion, issued by the ISA/CN National Intellectual Property Administration; regarding corresponding patent application Serial No. PCT/CN2019/118076; dated Jul. 29, 2020; 9 pages.

*Primary Examiner* — James Keenan
(74) *Attorney, Agent, or Firm* — Greenberg Traurig, LLP

(57) ABSTRACT

Embodiments of present disclosure relate to a receiving station, an automatic guided vehicle (AGV), a pallet for use therewith, a conveying system, and a method for conveyance control. The receiving station comprises a carriage adapted to hook a pallet. The receiving station further comprises linear drive equipment operable to move the carriage in a first direction away from an AGV to load the pallet from the AGV or move the carriage in a second direction opposite to the first direction towards the AGV to unload the pallet onto the AGV, wherein the AGV stops near the receiving station, and wherein the carriage hooks the pallet during the movement of the carriage such that the pallet is moved along with the carriage.

12 Claims, 11 Drawing Sheets

(51) Int. Cl.
　*B65G 69/00*　　(2006.01)
　*G05D 1/00*　　(2024.01)

(52) U.S. Cl.
　CPC ......... *G05D 1/0223* (2013.01); *G05D 1/0225*
　　　(2013.01); *G05D 1/0231* (2013.01); *G05B*
　　　*2219/41104* (2013.01); *G05B 2219/41105*
　　　(2013.01); *G05B 2219/41106* (2013.01)

(58) Field of Classification Search
　USPC ........ 414/352, 395, 400, 396, 280; 180/168;
　　　　　　318/592; 701/23
　See application file for complete search history.

(56)　　　　　References Cited

U.S. PATENT DOCUMENTS

| | | | | |
|---|---|---|---|---|
| 4,597,709 | A * | 7/1986 | Yonezawa ............ | B23Q 7/1442 |
| | | | | 198/345.3 |
| 4,705,445 | A * | 11/1987 | Morita ................ | B65G 1/0435 |
| | | | | 414/280 |
| 4,746,258 | A * | 5/1988 | Loomer ............... | B23Q 7/1442 |
| | | | | 414/349 |
| 4,773,811 | A * | 9/1988 | Wasner ................ | B23Q 7/1442 |
| | | | | 414/401 |
| 4,818,171 | A * | 4/1989 | Burkholder .......... | B65G 1/0485 |
| | | | | 414/495 |
| 5,211,523 | A * | 5/1993 | Andrada Galan ...... | B60L 50/52 |
| | | | | 414/280 |

| | | | | |
|---|---|---|---|---|
| 5,346,352 | A * | 9/1994 | Ito ........................... | B65G 65/00 |
| | | | | 414/400 |
| 5,525,025 | A * | 6/1996 | Ootmar Ten Cate ........................ | |
| | | | | B23Q 7/1442 |
| | | | | 198/782 |
| 5,525,884 | A * | 6/1996 | Sugiura ................ | G05D 1/0261 |
| | | | | 318/587 |
| 6,390,314 | B1 * | 5/2002 | Pinlam .................... | B60D 1/58 |
| | | | | 213/88 |
| 7,044,247 | B2 * | 5/2006 | Johansson .............. | B63B 27/19 |
| | | | | 414/673 |
| 2004/0081540 | A1 * | 4/2004 | Uebach ................ | B65G 63/025 |
| | | | | 414/395 |

FOREIGN PATENT DOCUMENTS

| | | | | | |
|---|---|---|---|---|---|
| CN | 207046208 | U | 2/2018 | | |
| CN | 207121168 | U | 3/2018 | | |
| CN | 109018072 | A | 12/2018 | | |
| CN | 208469989 | U | 2/2019 | | |
| CN | 110422540 | A | 11/2019 | | |
| DE | 3910614 | A1 * | 10/1990 | .......... | B23Q 7/1442 |
| DE | 202018101313 | U1 | 4/2018 | | |
| EP | 0560204 | A1 * | 9/1993 | .......... | B23Q 7/1442 |
| EP | 3214026 | A1 * | 9/2017 | ............ | B65G 67/02 |
| JP | 59194938 | A * | 11/1984 | .......... | B65G 63/025 |
| JP | H04266333 | A | 9/1992 | | |
| JP | 2007193747 | A | 8/2007 | | |
| WO | 2014159916 | A2 | 10/2014 | | |
| WO | 2019084336 | A1 | 5/2019 | | |
| WO | 2019090196 | A1 | 5/2019 | | |

* cited by examiner

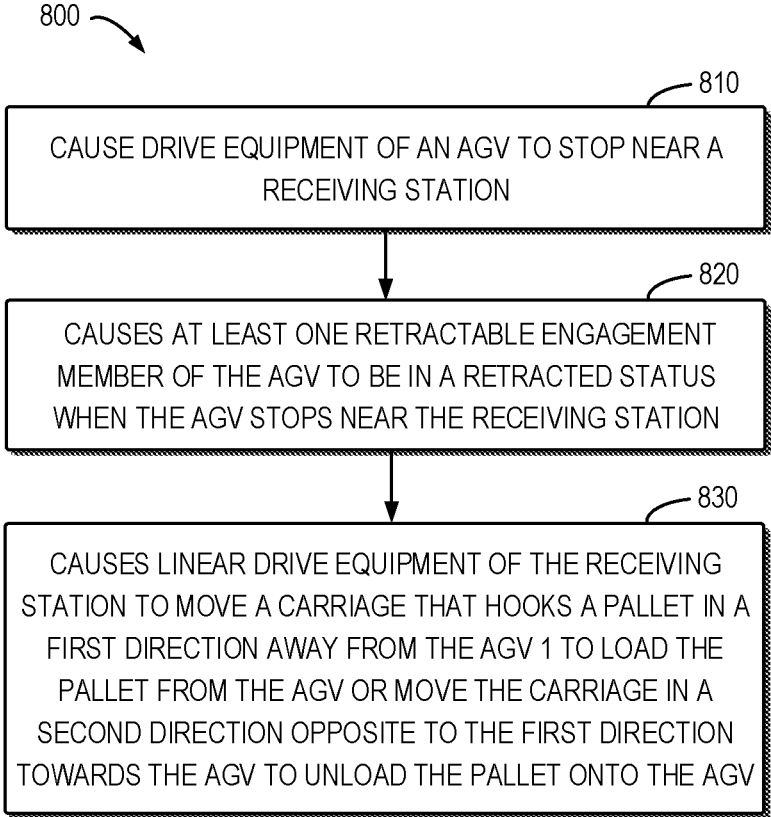

800

810
CAUSE DRIVE EQUIPMENT OF AN AGV TO STOP NEAR A RECEIVING STATION

820
CAUSES AT LEAST ONE RETRACTABLE ENGAGEMENT MEMBER OF THE AGV TO BE IN A RETRACTED STATUS WHEN THE AGV STOPS NEAR THE RECEIVING STATION

830
CAUSES LINEAR DRIVE EQUIPMENT OF THE RECEIVING STATION TO MOVE A CARRIAGE THAT HOOKS A PALLET IN A FIRST DIRECTION AWAY FROM THE AGV 1 TO LOAD THE PALLET FROM THE AGV OR MOVE THE CARRIAGE IN A SECOND DIRECTION OPPOSITE TO THE FIRST DIRECTION TOWARDS THE AGV TO UNLOAD THE PALLET ONTO THE AGV

Fig. 8

LOADING AND UNLOADING FOR AUTOMATIC GUIDED VEHICLE

CROSS-REFERENCE TO RELATED APPLICATIONS

This is a national stage application which claims priority to International patent application Serial No.: PCT/CN2019/118076, filed on Nov. 13, 2019; and which is herein incorporated by reference in its entirety.

FIELD

Embodiments of the present disclosure generally relate to the field of manufacturing and more particularly, to a receiving station, an automatic guided vehicle, a pallet for use therewith, a conveying system, and a method for conveyance control.

BACKGROUND

Automatic guided vehicle (AGV) is utilized in a manufacturing plant for material handling or transferring. The AGV refers to a transport vehicle that is capable of traveling along a prescribed guiding path. Navigation and positioning of the AGV are generally important in practice of the AGV.

The navigation of the AGV adopts several approaches such as line guiding, simultaneous locating and mapping (SLAM), reflective plate laser scan, vision guiding, inertial guiding based on gyroscope, or combination thereof, etc. In the line guiding, the AGV travels along a guiding line with magnetic tapes attached onto a floor surface of the manufacturing plant, and the navigation is realized through magnetic induction signals.

There are some traditional solutions for an AGV to escort a pallet carrying material to a production line. Chinese Patent Publication No. CN106103316A discloses a conveying system where a body of an AGV together with a pallet carried thereon is turned 90 degree to enter to a hosting station for positioning, detection, and unloading of material. Chinese Patent Publication No. CN106103006A discloses a conveying system where the AGV moves towards its side way without turning the body or pallet carried thereon when approaching a host station to unload material.

In these traditional solutions, since the AGV should dramatically decrease its velocity when turning or side moving, the time cost for loading or unloading processes increases, resulting in massive traffic jam in the manufacturing plant. Moreover, due to the turning or movement of the AGV relative to the host station, it is difficult to align the AGV trajectory with the guiding line and may eventually result in loss of guidance of the AGV along the guiding line.

It is desirable to provide an improved solution of loading and unloading for an AGV

SUMMARY

In order to at least partially solve the above and potentially other problems, embodiments of the present disclosure provide an improved solution of loading and unloading for an AGV. Generally, embodiments of the present disclosure are directed to a receiving station, an AGV, a pallet for use in association with the receiving station or the AGV, a conveying system, and a method for conveyance control.

In a first aspect, embodiments of the present disclosure provide a receiving station. The receiving station comprises a carriage adapted to hook a pallet; and linear drive equipment operable to move the carriage in a first direction away from an automatic guided vehicle to load the pallet from the automatic guided vehicle or move the carriage in a second direction opposite to the first direction towards the automatic guided vehicle to unload the pallet onto the automatic guided vehicle, wherein the automatic guided vehicle stops near the receiving station, and wherein the carriage hooks the pallet during the movement of the carriage such that the pallet is moved along with the carriage.

In some embodiments, the carriage is adapted to hook a hooking mechanism of the pallet.

In some embodiments, the receiving station further comprises at least one retractable engagement member operable to be in an extended status to engage with the pallet when the pallet is carried on the receiving station and the carriage is stationary and operable to be in a retracted status to disengage from the pallet before the carriage is moved.

In some embodiments, the receiving station further comprises a set of guiding rotational elements disposed to guide the movement of the pallet on at least one guiding plate of the pallet in the first direction or the second direction.

In some embodiments, the receiving station further comprises a set of passive rotational elements disposed to support the pallet.

In some embodiments, the first and second directions are perpendicular to an extending direction of a guiding line along which the automatic guided vehicle travels and stops.

In some embodiments, the receiving station is secured at a position near the guiding line.

In a second aspect, embodiments of the present disclosure provide an automatic guided vehicle. The automatic guided vehicle comprises drive equipment operable to drive the automatic guided vehicle to travel and stop along a guiding line; and at least one retractable engagement member operable to be in a retracted status when the automatic guided vehicle stops near a receiving station and in an extended status to engage with a pallet when the pallet is carried on the automatic guided vehicle. In the retracted status of the at least one retractable engagement member, the pallet is moved by the receiving station away from the automatic guided vehicle in a first direction to be loaded onto the receiving station, or the pallet is moved by the receiving station towards the automatic guided vehicle in a second direction to be unloaded onto the automatic guided station, the second direction being opposite to the first direction.

In some embodiments, the automatic guided vehicle further comprises a set of guiding rotational elements disposed to guide the movement of the pallet on at least one guiding plate of the pallet in the first direction or the second direction.

In some embodiments, the automatic guided vehicle further comprises a set of passive rotational elements disposed to support the pallet.

In some embodiments, the drive equipment is operable to drive the automatic guided vehicle to travel at a reduced velocity when the automatic guided vehicle is approaching the receiving station, and drive the automatic guided vehicle to stop at a stop position near the receiving station.

In some embodiments, the drive equipment is operable to: drive the automatic guided vehicle to adjust a positioning of the automatic guided vehicle relative to the receiving station when the automatic guided vehicle stops near the receiving station. In some embodiments, the at least one retractable engagement member is operable to be in the retracted status after the positioning has been adjusted.

In some embodiments, the first and second directions are perpendicular to an extending direction of the guiding line.

In a third aspect, embodiments of the present disclosure provide a pallet for use in association with the receiving station according to the first aspect or the automatic guided vehicle according to the second aspect. The pallet comprises a hooking mechanism adapted to hook a carriage of the receiving station.

In some embodiments, the hooking mechanism is arranged to avoid being blocked when the pallet is carried on the automatic guided vehicle and is adapted to hook the carriage of the receiving station when the automatic guided vehicle stops near the receiving station.

In some embodiments, the hooking mechanism comprises a cam roller.

In a fourth aspect, embodiments of the present disclosure provide a conveying system. The conveying system comprises a receiving station according to the first aspect, an automatic guided vehicle according to a second aspect, and a pallet according to a third aspect.

In a fifth aspect, embodiments of the present disclosure provide a method for conveyance control. The method comprises causing drive equipment of an automatic guided vehicle to stop near a receiving station; causing at least one retractable engagement member of the automatic guided vehicle to be in a retracted status when the automatic guided vehicle stops near the receiving station; and causing linear drive equipment of the receiving station to move a carriage that hooks a pallet in a first direction away from the automatic guided vehicle to load the pallet from the automatic guided vehicle or move the carriage in a second direction opposite to the first direction towards the automatic guided vehicle to unload the pallet onto the automatic guided vehicle, wherein the carriage hooks the pallet during the movement of the carriage such that the pallet is moved along with the carriage.

In some embodiments, the method further comprises causing at least one retractable engagement member of the receiving station be in an extended status to engage with the pallet when the pallet is carried on the receiving station and the carriage is stationary and operable to be in a retracted status to disengage from the pallet before the carriage is moved In some embodiments, the method further comprises causing the drive equipment of the automatic guided vehicle to adjust a positioning of the automatic guided vehicle relative to the receiving station when the automatic guided vehicle stops near the receiving station.

BRIEF DESCRIPTION OF THE DRAWINGS

Drawings described herein are provided to further explain the present disclosure and constitute a part of the present disclosure. The example embodiments of the disclosure and the explanation thereof are used to explain the present disclosure, rather than to limit the present disclosure improperly.

FIG. 8 illustrates a flowchart of a method for conveyance control according to an embodiment of the present disclosure.

Throughout the drawings, the same or similar reference symbols are used to indicate the same or similar elements.

DETAILED DESCRIPTION

Figure 1:
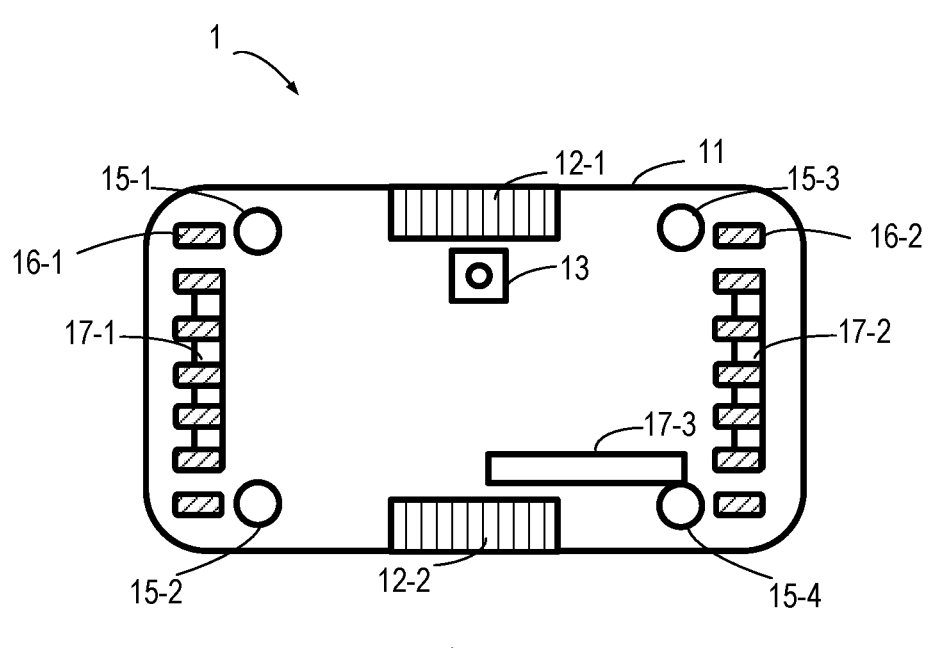
FIG. 1 illustrates a perspective diagram of an AGV according to an embodiment of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As mentioned above, the traditional solutions for an AGV to load or unload material is unbeneficial. According to embodiments of the present disclosure, an improved solution is proposed. In this solution, an AGV travels and stops along a guiding line to load a pallet to a receiving station or unload a pallet from the receiving station. When the AGV stops near the receiving station, a carriage of the receiving station hooks the pallet and is moved by linear drive equipment. To load the pallet from the AGV onto the receiving station, the linear drive equipment moves the carriage in a first direction away from the AGV such that the pallet is moved along with the carriage away from the AGV To unload the pallet from the receiving station onto the AGV, the linear drive equipment moves the carriage in an opposite second direction towards the AGV such that the pallet is moved along with the carriage towards the AGV. The pallet is engaged with one or more retractable engagement member when being carried on the AGV during travelling of the AGV According to this solution, the loading and unloading time of the pallet between the AGV and the receiving station is shorten by avoiding turning or side moving of the AGV, which can smooth the motion of the AGV and increase a total uptime of the AGV. Further, the AGV is possible to perform both loading and unloading tasks in one dispatchment, which can reduce the total number of dispatched AGV on site and/or reduce the traffic jam on site, thereby improving the overall efficiency. In addition, no extra drive equipment is required on the AGV to move the pallet, which can simplify the AGV design.

Hereinafter, some example embodiments of the present disclosure will be described in detail with reference to the accompanying drawings.

Figure 2:
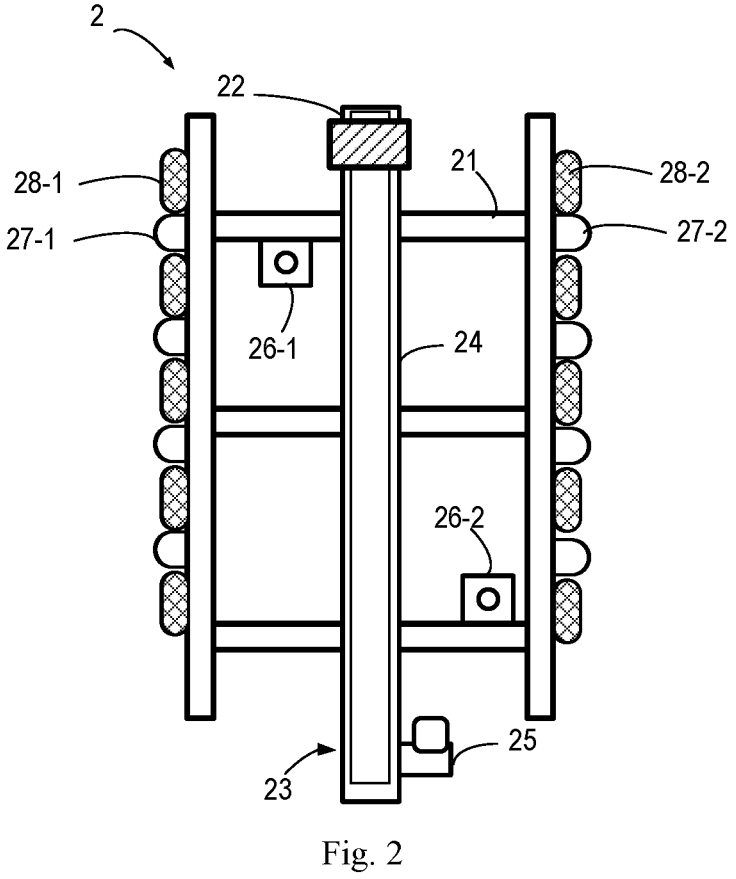
FIG. 2 illustrates a perspective diagram of a receiving station according to an embodiment of the present disclosure.
Figure 3:
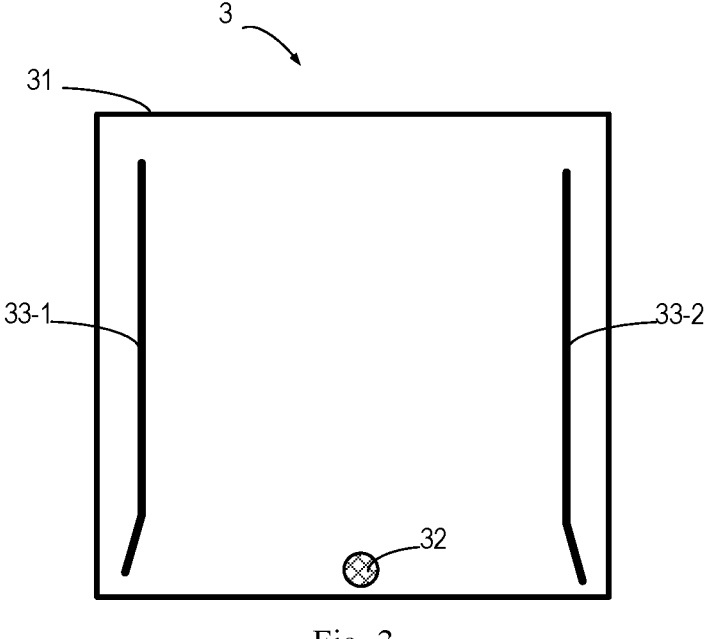
FIG. 3 illustrates a perspective diagram of a pallet according to an embodiment of the present disclosure.

Structures of an AGV 1, a receiving station 2, and a pallet 3 are first introduced with reference to FIGS. 1 to 3. The pallet 3 may be placed on the AGV 1 to travel together with the AGV 1. Manufacturing materials and/or workpieces may be carried on the pallet 3 to convey to any destination by the AGV 1. The receiving station 2 is arranged near to an entrance to a spot where the manufacturing materials and/or workpieces may be needed in a manufacturing plant, for example. The pallet 3 may also be placed on the receiving station 2.

As shown in FIG. 1, the AGV 1 includes a body 11 and drive equipment to facilitate travelling of the AGV 1. As shown, the AGV 1 may include parallel drive equipment 12-1, 12-2 (thus the drive equipment may be collectively referred to as drive equipment 12). The drive equipment 12 may include one or more drive motors and one or more drive wheels to drive the AGV 1 for movement. The AGV 1 further includes at least one retractable engagement member 13 which is operable to be in a retracted status or an extended status. In the example of FIG. 1, only one retractable engagement member 13 is illustrated. The number of the at least one retractable engagement member 13 may be two, three, or more.

The at least one retractable engagement member 13 is disposed on the body 11 and is arranged to engage with a pallet 3 in the extended status or disengage from the pallet 3 in the retracted status when the pallet 3 is placed on the body 11 of the AGV 1. For example, the at least one retractable engagement member 13 in the extended status may be mated into a recess on the bottom of the pallet 3 when the pallet is placed on the body 11. In some embodiments, the at least one retractable engagement member 13 may be at least one retractable tow pin.

In some embodiments, the AGV 1 may further include a set of guiding rotational elements 15-1, 15-2, 15-3, and 15-4 disposed on the body 11 of the AGV 1 to guide movement of the pallet 3 on the body 11. At least one guiding plate 33-1, 33-2 of the pallet 3 (as show in FIG. 3) is displaced on the set of guiding rotational elements 15-1, 15-2, 15-3, and 15-4 to facilitate the guiding of the pallet's movement. In the example of FIG. 1, four guiding rotational elements are illustrated. In other examples, the number of the guiding rotational elements may be less than four or more than four. The set of guiding rotational elements 15-1, 15-2, 15-3, and 15-4 rotate while the pallet 3 is moving on the body 11. In some embodiments, the set of guiding rotational elements 15-1, 15-2, 15-3, and 15-4 may be cam rollers.

In some example embodiments, the AGV 1 may further include a set of passive rotational elements 16-1, 16-2 disposed to support the pallet 3. In the example of FIG. 1, fourteen passive rotational elements are illustrated. In other examples, the number of the passive rotational elements may be less than fourteen or more than fourteen. The passive rotational elements 16-1, 16-2 rotate passively while the pallet 3 is moving on the body 11. The passive rotational elements 16-1, 16-2 are provided to smooth the movement of the pallet 3 on the body 11 and avoid potential damage caused to the pallet 3 itself or the materials or workpieces carried on the pallet 3. In some embodiments, the passive rotational elements 16-1, 16-2 may be passive rollers.

The set of guiding rotational elements 15-1, 15-2, 15-3, and 15-4 and the set of guiding rotational elements 16-1, 16-2 are arranged to guide and support the pallet 3 such that the movement of the pallet 3 on the body 11 will be guided in a predetermined path. In some embodiments, the set of passive rotational elements 16-1, 16-2 and the set of guiding rotational elements 15-1, 15-2, 15-3, and 15-4 are disposed in a direction in parallel with a moving direction of the pallet 3 on the body 11. In some embodiments, the set of guiding rotational elements 15-1, 15-2, 15-3, and 15-4 may be arranged as two or more groups, each of the groups of guiding rotational elements 15-1, 15-2, 15-3, and 15-4 are disposed in a direction in parallel with a moving direction of the pallet 3 on the body 11. In the example shown in FIG. 1, the set of guiding rotational elements 15-1, 15-2, 15-3, and 15-4 are divided into two groups. Similarly, the set of passive rotational elements 16-1, 16-2 may also be arranged as two or more groups, each of the groups of passive rotational elements 16-1, 16-2 are disposed in a direction in parallel with the moving direction of the pallet 3 on the body 11. It would be appreciated that the arrangement of the guiding rotational elements and passive rotational elements may be in any other form to facilitate the movement of the pallet 3.

As shown in FIG. 2, the receiving station 2 includes a framework 21, a carriage 22, and linear drive equipment 23. The linear drive equipment 23 includes a main shaft 24 and a motor drive unit 25 to move the carriage 22 along the shaft 24. The motor drive unit 25 is a linear actuator that creates motion in a straight line. As such, the carriage 22 is moved in a straight line along the shaft 24. The carriage 22 is adapted to hook a pallet 3 such that the pallet 3 is moved along with the carriage 22. As shown in FIG. 3, the pallet 3 includes a body 31 and a hooking mechanism 32. The hooking mechanism 32 is adapted to hook the carriage 22 of the receiving station 3.

The receiving station 2 further includes two or more retractable engagement members 26-1, 26-2 which are operable to be in a retracted status or an extended status. In the example of FIG. 1, two retractable engagement members 26-1, 26-2 are illustrated. The number of the retractable engagement member(s) may be one, three, or more.

The retractable engagement members 26-1, 26-2 are disposed on the framework 21 and are arranged to engage with a pallet 3 in the extended status or to disengage from the pallet 3 in the retracted status when the pallet 3 is placed on the body 11 of the receiving station 2. For example, the retractable engagement members 26-1, 26-2 in the extended status may be mated into recesses on the bottom of the pallet 3 when the pallet 3 is placed on the framework 21. In some embodiments, the retractable engagement members 26-1, 26-2 may be retractable pins. To dispose more than one retractable engagement members for the receiving station 2, it is possible to have precise positioning of the pallet 3 placed thereon. As such, the precisely-positioned pallet 3 can be well unloaded onto or loaded from the AGV 1 when needed.

Since the pallet 3 may also be carried and moved on the receiving station 2, in some embodiments, as shown in FIG. 2, the receiving station 2 may also include a set of guiding rotational elements 27-1, 27-2 disposed to guide the movement of the pallet 3 on the guiding plates 33-1, 33-2 of the pallet 3 when the pallet 3 is placed on the receiving station 3, and a set of passive rotational elements 28-1, 28-2 disposed to support the pallet 3. It would be appreciated that the arrangement of the guiding rotational elements and passive rotational elements may be in any other form to facilitate the movement of the pallet 3.

In the example of FIG. 2, ten guiding rotational elements and ten passive rotational elements are illustrated. In other examples, the number of the guiding rotational elements and the number of the passive rotational elements may be less than ten or more than ten. The set of guiding rotational elements 27-1, 27-2 may be passive guiding rollers, which rotate passively while the pallet 3 is moving on the receiving station 2. In some embodiments, the set of guiding rotational elements 27-1, 27-2 may be passive guiding rollers. The set of passive rotational elements 28-1, 28-2 may be passive guiding roller, which rotate passively while the pallet 3 is moving on the receiving station 2. In some embodiments, the set of guiding rotational elements 28-1, 28-2 may be passive guiding rollers.

Figure 4A:
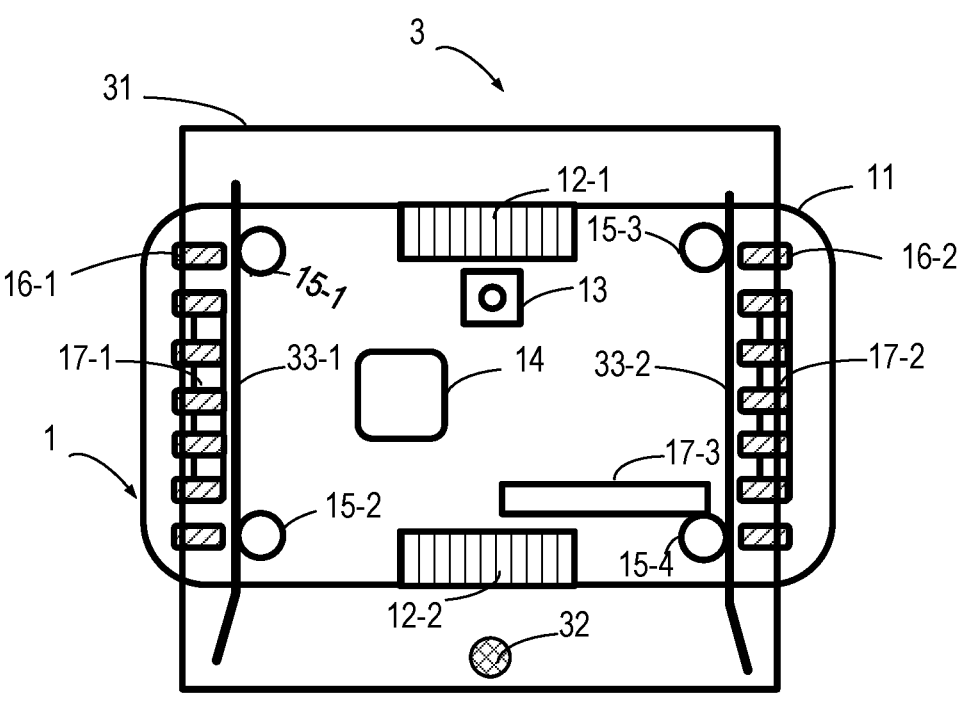
FIG. 4A illustrates a bonding view of the AGV of FIG. 1 and the pallet of FIG. 3 according to an embodiment of the present disclosure.
Figure 4B:
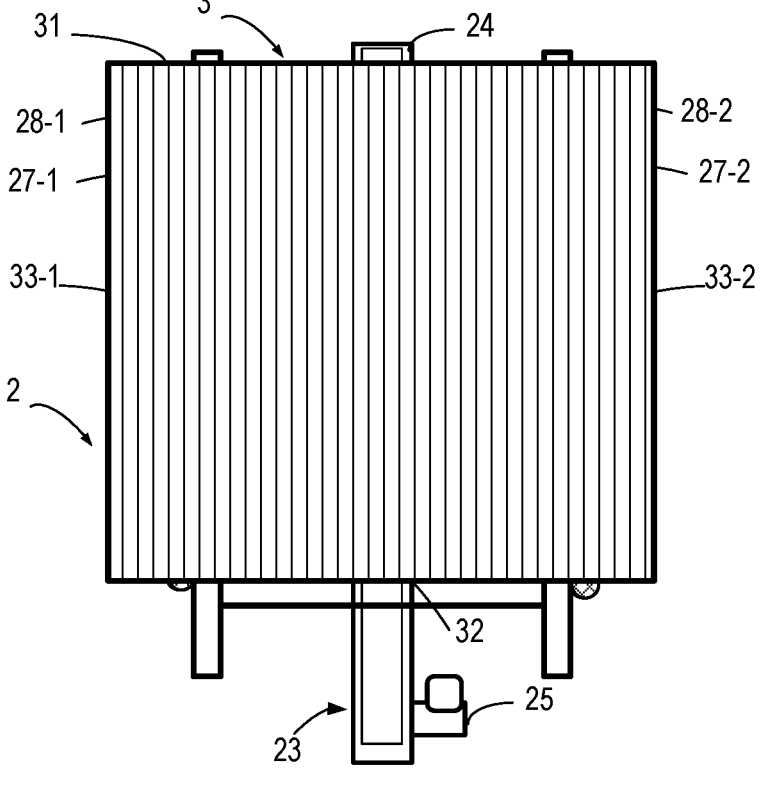
FIG. 4B illustrates a bonding view of the receiving of FIG. 2 and the pallet of FIG. 3 according to an embodiment of the present disclosure.

FIG. 4A and FIG. 4B illustrate bonding of the AGV 1 of FIG. 1 and the pallet 3 of FIG. 3 and bonding of the receiving station 2 of FIG. 2 and the pallet 3 of FIG. 3, respectively. As shown in FIG. 4A, the pallet 3 is carried on the body 11 of the AGV 1 in a secured position where the retractable engagement member 13 may be in an extended status to engage with the pallet 3 (for example, mate into a recess on the bottom of the pallet 3). With the pallet 3 in the secured position, the AGV 1 can travel in any velocity with a reduced risk of dropping materials or workpieces carried on the pallet. The guiding rotational elements 15-1, 15-2, 15-3, and 15-4 are arranged to contact with the guiding plates 33-1, 33-2 to guide the movement of the pallet 3.

To facilitate hooking of the hooking mechanism 32 of the pallet 3 to the carriage 22 of the receiving station when the AGV 1 stops near the receiving station, the hooking mechanism 32 is arranged to avoid being blocked when the pallet 3 is carried on the AGV 1. For example, the hooking mechanism 32 may be arranged at a part of the pallet 3 that protrudes from the body 11 of the AGV 1.

As shown in FIG. 4B, when the pallet 3 is carried on the receiving station 2, for example, when the pallet 3 is loaded from the AGV 1 to the receiving station 2 or is to be unloaded from the receiving station 2 towards the AGV 1, the carriage 22 hooks the hooking mechanism 32 of the pallet 3. In some embodiments, to secure the pallet 3 on the framework 21, one or more of the retractable engagement members 26-1, 26-2 may be in an extended status to engage with the pallet 3 (for example, mate into one or more recesses on the bottom of the pallet 3). The guiding rotational elements 27-1, 27-2 are arranged to contact with the guiding plates 33-1, 33-2 to guide the movement of the pallet 3.

Figure 5A:
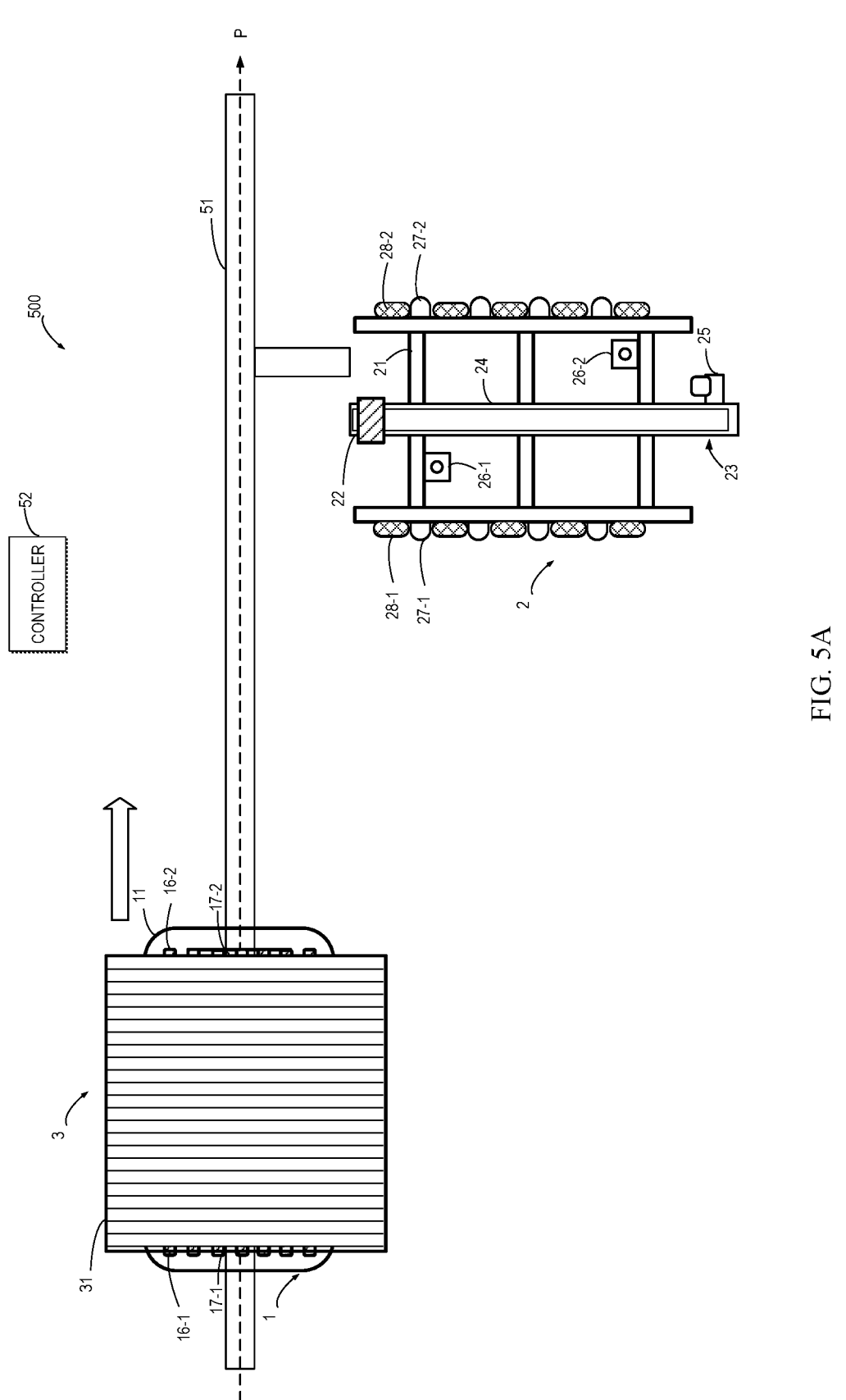
FIGS. 5A-5C illustrate schematic diagrams showing a conveying system where a pallet is loaded from an AGV to a receiving station according to an embodiment of the present disclosure.
Figure 5B:
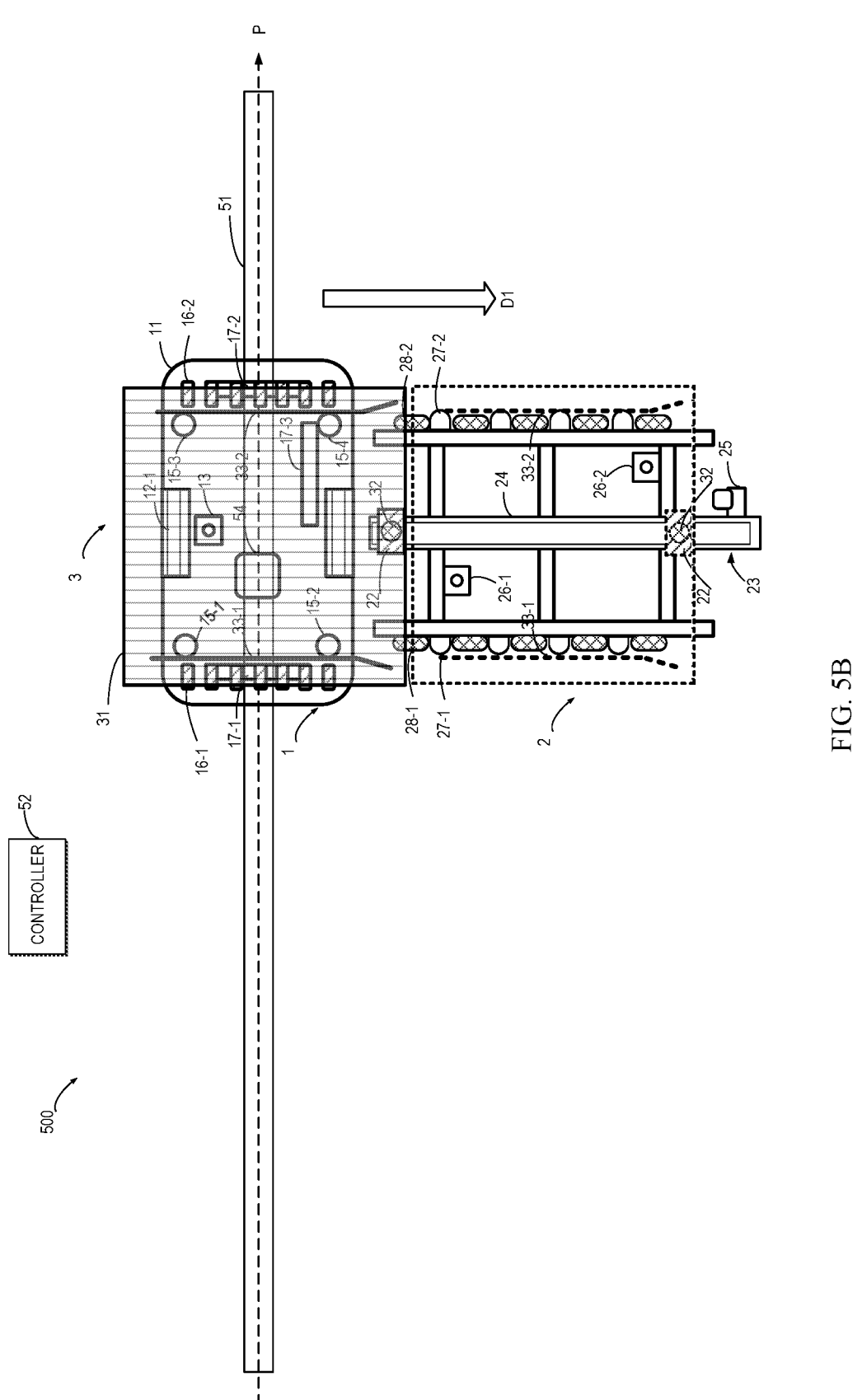
Figure 5C:
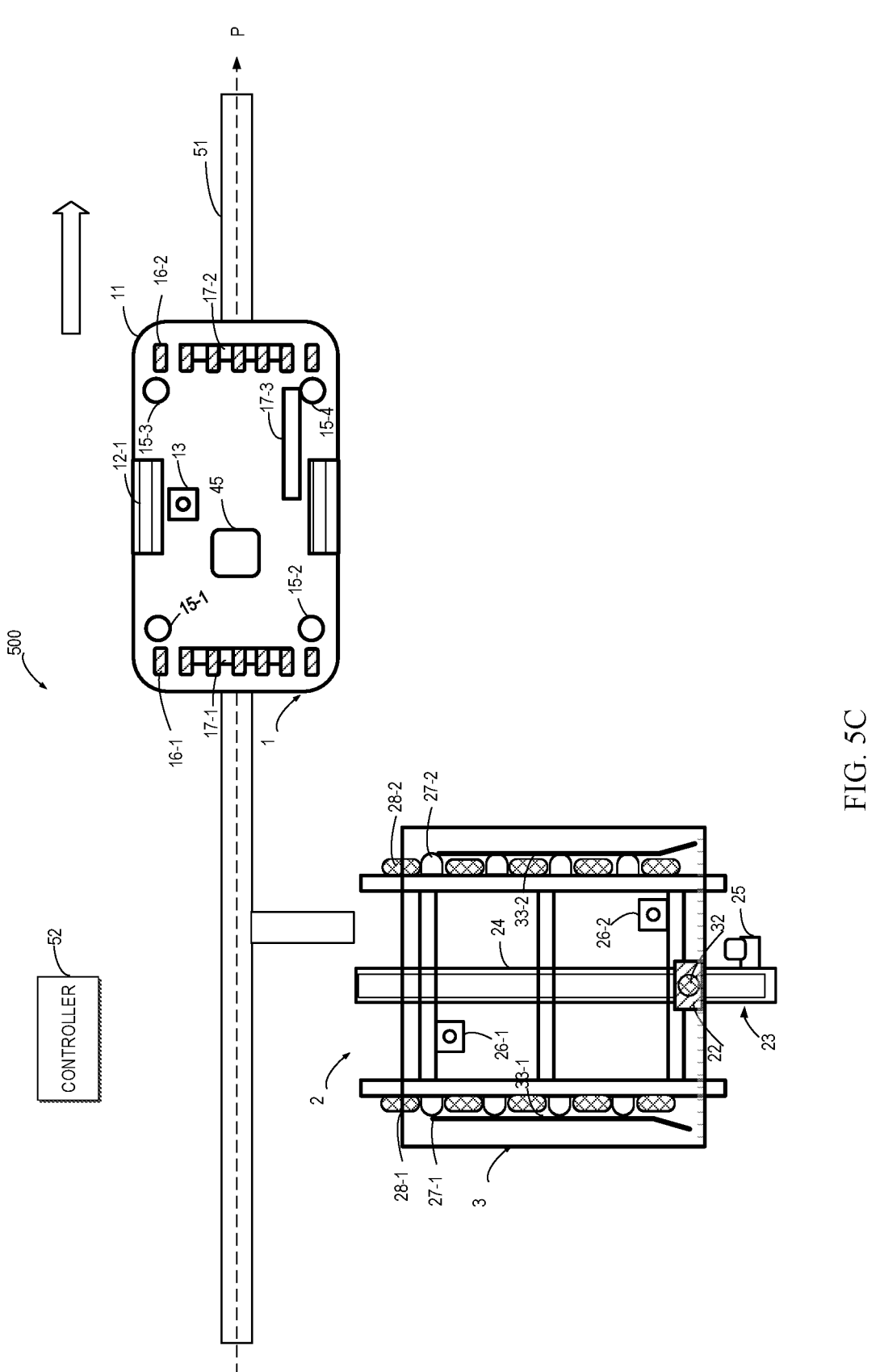
Figure 7A:
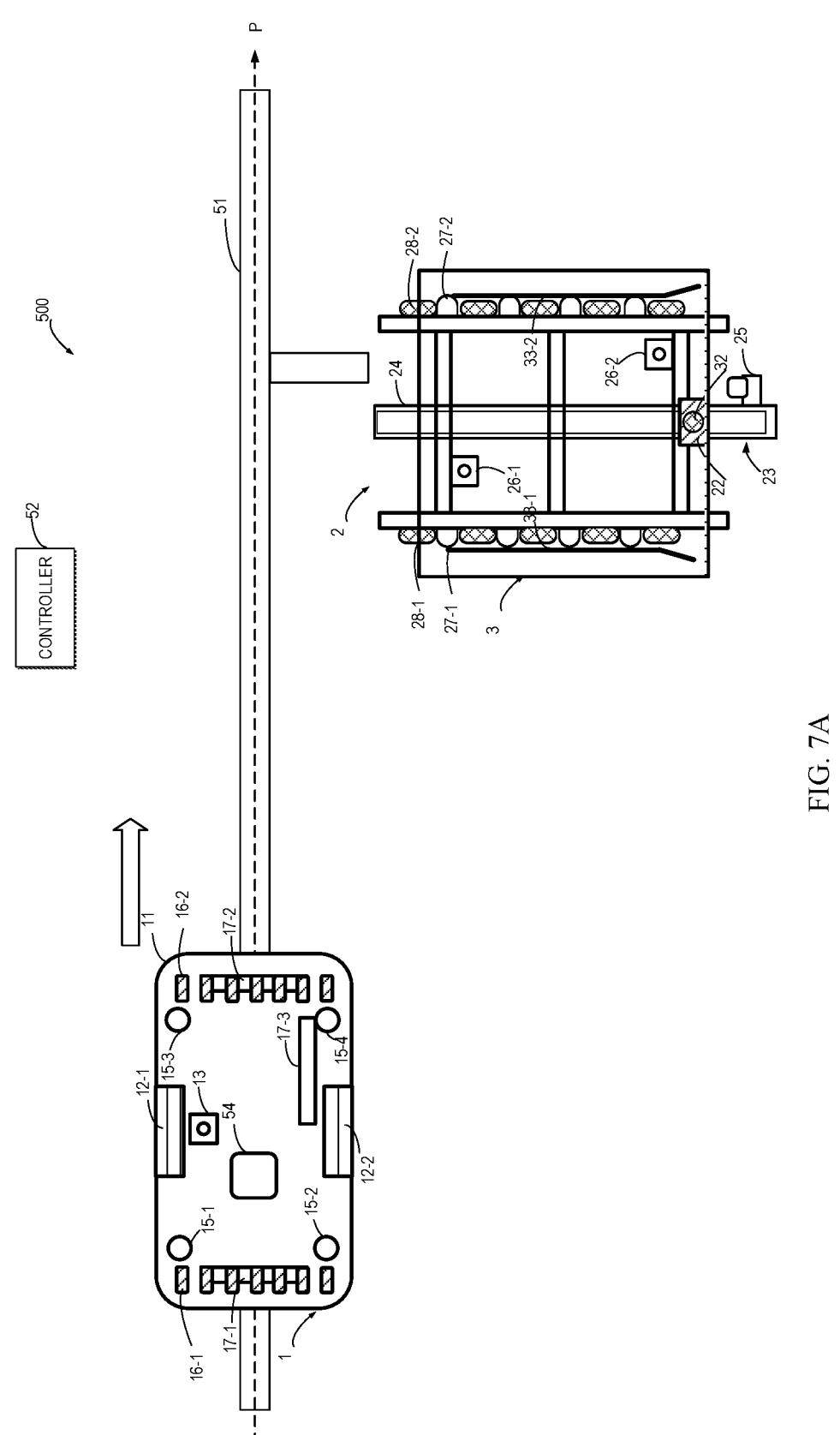
FIGS. 7A-7C illustrate schematic diagrams showing a conveying system where a pallet is unloaded from a receiving station to an AGV according to an embodiment of the present disclosure.
Figure 7B:
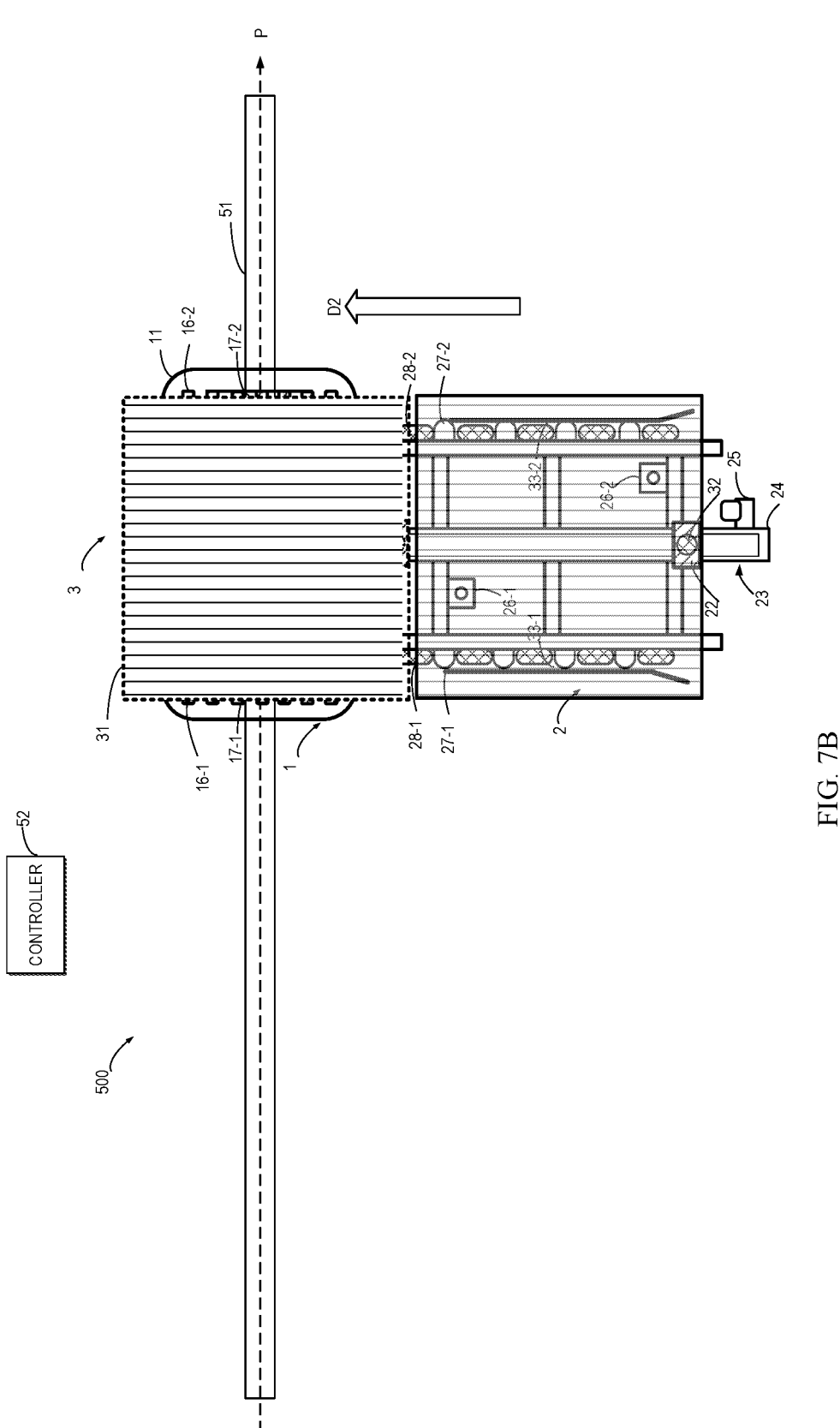
Figure 7C:
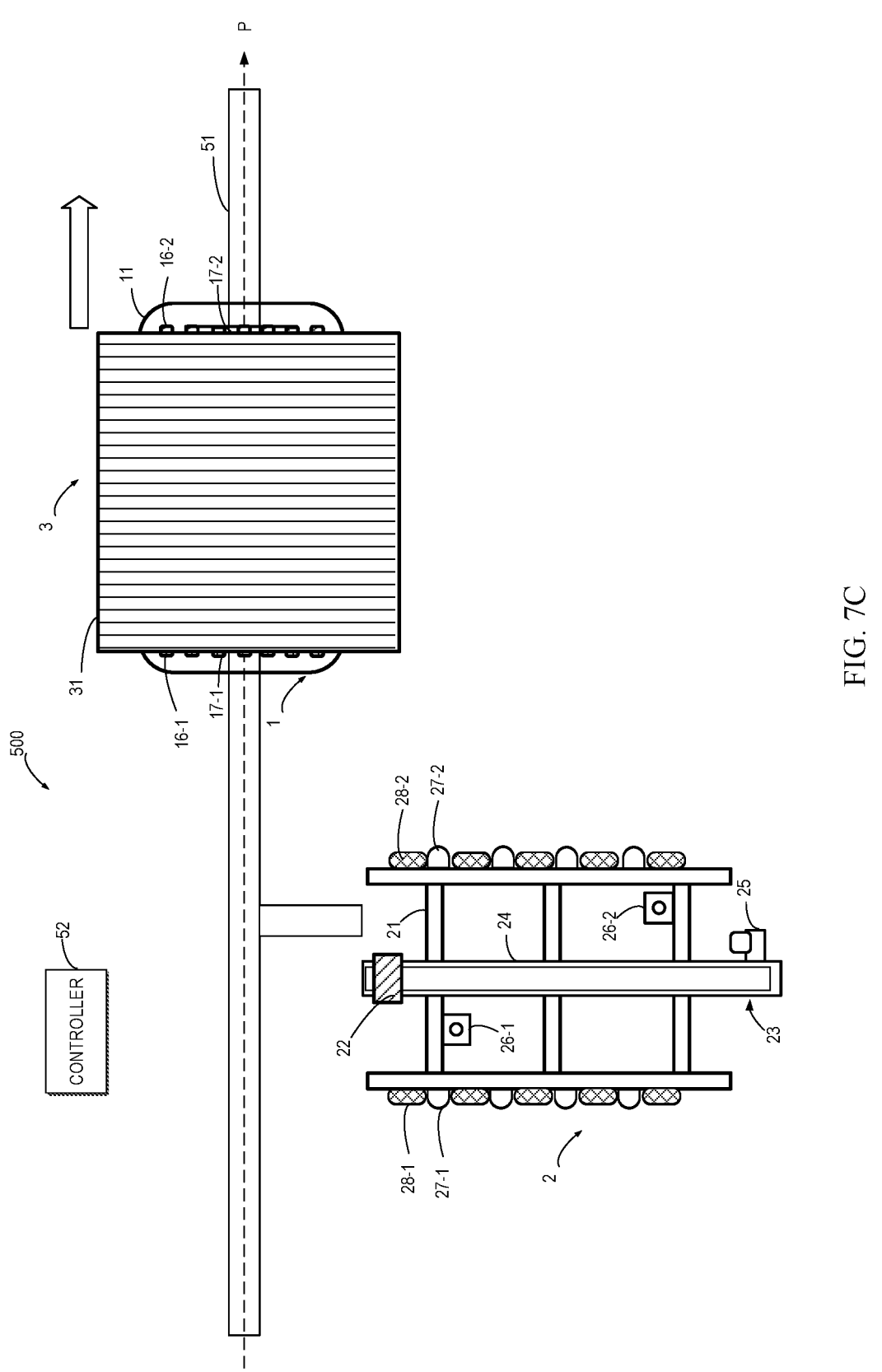

One or more AGVs 1, one or more receiving stations 2, and one or more pallets 3 may be used in a conveying system and work together to load and/or unload materials or workpieces in a manufacturing plant or any other suitable environment. FIGS. 5A-5C shows a conveying system 500 where a pallet 3 is loaded from an AGV 1 to a receiving station 2. FIGS. 7A-7C illustrate shows a conveying system 500 where a pallet 3 is unloaded from a receiving station 2 to an AGV 1 according to an embodiment of the present disclosure. It would be appreciated that although one AGV 1, one receiving station 2, and one pallet 3 are shown in the conveying system 500 illustrated in FIGS. 5A-5C and FIGS. 7A-7C, more AGVs 1, more receiving stations 2, and/or more pallets 3 may be included in the conveying system 500.

As shown in FIG. 5A, the AGV 1 carries a pallet 3 and travels along a guiding line 51 in an extending direction P of the guiding line 51. The drive equipment 12 of the AGV 1 drives the AGV 1 to travel and stop along the guiling line 51. As mentioned above, to secure the pallet 3, the retractable engagement member 13 is in an extended status to engage with the pallet 3 while the AGV 1 is traveling.

The AGV 1 stops near the receiving station 2 onto which the pallet 3 carried on the AGV 1 is expected to be loaded. The drive equipment 12 of the AGV 1 may drive the AGV 1 to travel at a reduced velocity when the AGV 1 is approaching the receiving station 2, and drive the AGV 1 to stop at a stop position near the receiving station 2.

In some embodiments, the travelling or stop of the AGV 1 may be controlled by a controller 52 in the conveying system 500. The AGV 1 may further include a wireless reader 54 to detect a stop command point for the AGV 1 on the guiding line 51. The wireless reader 54 may then generate a stop command to control the drive equipment 12 of the AGV 1 to brake and stop at the stop position. The stop command point for the AGV 1 may be set by the controller 52. In some embodiments, the wireless reader may include a sensor for reading radio frequency identification device (RFID) tag. In some embodiments, the controller 52 may directly communicate a stop command to a communication unit (not shown) on the AGV 1.

In some embodiments, the controller 52 may perform a secondary positioning process when the AGV 1 stops near the receiving station 2 to adjust a positioning of the AGV 1 relative to the receiving station 2 so as to ensure alignment of the AGV 1 with the receiving station 2. In some embodiments, the AGV 1 may include one or more sensors 17-1, 17-2, 17-3 to facilitate the secondary positioning of the AGV 1. Depending on the result of the secondary positioning process, the drive equipment 12 may drive the AGV 1 to adjust a positioning of the AGV 1 relative to the receiving station 2.

In some embodiments, the retractable engagement member 13 of the AGV 1 transitions from the extended status to a retracted status to disengage from the pallet 3 when the AGV 1 stops near the receiving station 3 such that the pallet 3 is movable on the body 11. In some embodiments, the retractable engagement member 13 transitions to the retracted status after the secondary positioning process is completed and the positioning of the AGV 1 has been adjusted. The transition of the retractable engagement member 13 may be controlled by the controller 52.

The receiving station 2 is positioned near the guiding line 51 along which the AGV 1 travels. In some embodiments, the receiving station 2 is secured and thus is stationary at a position near the guiding line 51. When the AGV 1 stops near the receiving station 2 and is positioned relative to the receiving station 2, as shown in FIG. 5B, the carriage 22 of the receiving station 2 hooks the pallet 3 by means of the hooking mechanism 32 on the pallet 3.

The linear drive equipment 23 of the receiving station 2 operates to move the carriage 22 in a direction D1 (sometimes referred to as a "first direction") away from the AGV 1 to load the pallet 3 from the AGV 1. The driving of the linear drive equipment 23 may be controlled by the controller 52.

With the carriage 22 hooking the pallet 3 during the movement of the carriage 3 in the direction D1, the pallet 3 is pulled and moved along with the carriage in the direction D1. When the carriage 22 is moved from its initial position to its destination position on the shaft 24, the pallet 3 may be loaded onto the receiving station 2. During this process, the AGV 1 stays stationary and is not required to actively drive the pallet 3 towards the receiving station 2. In some embodiments, the direction D1 is generally perpendicular to the extending direction P of the guiding line 51 along which the AGV travels and stops.

In some embodiments, when the pallet 3 is completed loaded onto the receiving station 2, the retractable engagement members 26-1, 26-2 may transition from a retracted status to an extended status to engage with the pallet 3 carried on the receiving station 2. The transition of the retractable engagement members 26-1, 26-2 may be controlled by the controller 52.

Figure 6:
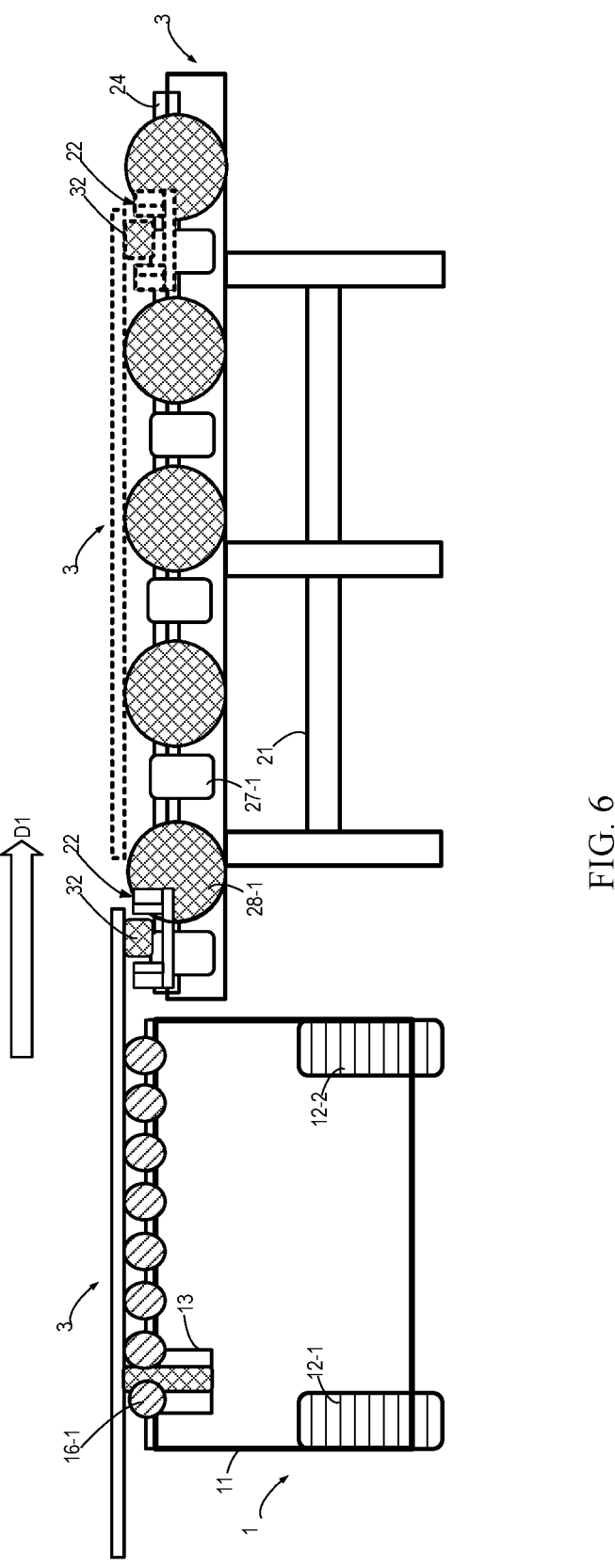
FIG. 6 illustrates a cross-sectional view of the AGV, the pallet and the receiving station when the pallet is loaded to the receiving station from the AGV according to an embodiment of the present disclosure.

FIG. 6 illustrates a cross-sectional view of the AGV 1, the pallet 3 and the receiving station 2 when the pallet 3 is loaded to the receiving station 2 from the AGV 1.

After the pallet 3 is evacuated from the AGV 1, in some embodiments, the AGV 1 may wait near the receiving station 2 to unload the same pallet 3 or a different pallet 3 from the receiving station 3. In some embodiments, the AGV 1 may continue traveling along the guiding line 51, heading to a next destination, as shown in FIG. 5C.

In the example of unloading a pallet 3 from a receiving station 3 onto an AGV 1 as shown in FIG. 7A, the AGV 1, without any pallet 3 carried thereon (for example, after having the pallet 3 loaded to a receiving station 2 in the example of FIGS. 5A and 5C), may travel along the guiding line 51 and stops near a receiving station 2. The travelling and stop of the AGV 1 may be similar as discussed above. The AGV 1 typically reduces its velocity and stops near the receiving station 2 from which the pallet 3 carried thereon is to be unloaded. In some embodiments, secondary positioning of the AGV 1 relative to the receiving station 2 may be performed to ensure alignment of the AGV 1 with the receiving station 2.

The receiving station 2 carries a pallet 3 which is needed to be conveyed to a certain destination. When the AGV 1 stops near the receiving station 2 and is positioned relative to the receiving station 2, as shown in FIG. 7B, the carriage 22 of the receiving station 2 hooks the pallet 3 by means of the hooking mechanism 32 on the pallet 3.

The linear drive equipment 23 of the receiving station 2 operates to move the carriage 22 in a direction D2 (sometimes referred to as a "second direction") away from the AGV 1 to unload the pallet 3 onto the AGV 1. The driving of the linear drive equipment 23 may be controlled by the controller 52. The direction D2 is opposite to the direction D1. The direction D2 is thus generally perpendicular to the extending direction P of the guiding line 51 along which the AGV travels and stops. The retractable engagement members 26-1, 26-2 may transition from the extended status to the retracted status before the movement of the carriage 3 such that the pallet 3 carried on the receiving station 2 is moveable. The transition of the engagement members 26-1, 26-2 may also be controlled by the controller 52.

With the carriage 22 hooking the pallet 3 during the movement of the carriage 3 in the direction D2, the pallet 3 is moved along with the carriage in the direction D1 and is pushed onto the AGV 1. When the carriage 22 is moved from its initial position to its destination position on the shaft 24, the pallet 3 may be unloaded from the receiving station 2 onto the AGV 1. During this process, the AGV 1 stays stationary and is not required to actively drive the pallet 3 away from the receiving station 2.

In some embodiments, when the pallet 3 is completed loaded onto the AGV 1, the retractable engagement member 13 of the AGV 1 may transition from the retracted status to the extended status to engage with the pallet 3 carried on the AGV 1. The transition of the retractable engagement member 13 may be controlled by the controller 52.

After the pallet 3 is evacuated from the receiving station 2, in some embodiments, the AGV 1 may continue to travel along the guiding line 51, heading to a destination of the pallet 3 carried thereon, as shown in FIG. 7C.

In some embodiments, a plurality of pallets 3 used in the conveying system 500 may have a standard design such that the pallets can be carried on any AGV 1 or any receiving station 2.

FIG. 8 illustrates a flowchart of a method 800 for conveyance control according to an embodiment of the present disclosure. The method 800 may be implemented at the controller 52.

At block 810, the controller 52 causes drive equipment 12 of an AGV 1 to stop near a receiving station 2. At block 820, the controller 52 causes at least one retractable engagement member 13 of the AGV 1 to be in a retracted status when the AGV 1 stops near the receiving station 2. At block 830, the controller 52 causes linear drive equipment 23 of the receiving station 2 to move a carriage 22 that hooks a pallet 3 in a first direction away from the AGV 1 to load the pallet 3 from the AGV 1 or move the carriage 22 in a second direction opposite to the first direction towards the AGV 1 to unload the pallet 3 onto the AGV 1. The carriage 22 hooks the pallet 3 during the movement of the carriage 22 such that the pallet 3 is moved along with the carriage 22.

In some embodiments, the controller 52 may further cause at least two retractable engagement members 26-1, 26-2 of the receiving station 2 to be in an extended status to engage with the pallet 3 when the pallet 3 is carried on the receiving station 2 and the carriage 22 is stationary and operable to be in a retracted status to disengage from the pallet 3 before the carriage 22 is moved.

In some embodiments, the controller 52 may further cause the at least one retractable engagement member 13 of the AGV 1 to be in an extended status to engage with the pallet 3 when the pallet 3 is carried on the AGV 1.

In some embodiments, the controller 52 may further cause the drive equipment 12 of the AGV 1 to adjust a positioning of the AGV 1 relative to the receiving station 2 when the AGV 1 stops near the receiving station 2.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein.

It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An automatic guided vehicle, comprising:
drive equipment operable to drive the automatic guided vehicle to travel and stop along a guiding line;
a first sensor configured to facilitate a first positioning of the automatic guided vehicle relative to a receiving station by detecting a stop command point along the guiding line;
one or more second sensors configured to facilitate a secondary positioning of the automatic guided vehicle along the guiding line and relative to the receiving station after stopping at the stop command point along the guiding line;
at least one retractable engagement member operable to be in a retracted status when the automatic guided vehicle stops near the receiving station and in an extended status to engage with a pallet when the pallet is carried on the automatic guided vehicle;
a set of guiding rotational elements;
a set of passive rotational elements, and
wherein the set of guiding rotational elements are arranged at the automatic guided vehicle so as to be disposed at a first side of at least one guiding plate of the pallet and the set of passive rotational elements are arranged at the automatic guided vehicle so as to be disposed at a second side of the at least one guiding plate of the pallet opposite the first side,
wherein in the retracted status of the at least one retractable engagement member,
the pallet is configured to be moved away from the automatic guided vehicle in a first direction to be loaded onto the receiving station, or
the pallet is configured to be moved towards the automatic guided vehicle in a second direction to be unloaded onto the automatic guided vehicle, the second direction being opposite to the first direction.

2. The automatic guided vehicle of claim 1,
wherein the set of guiding rotational elements are disposed at the first side of the at least one guiding plate to guide movement of the pallet in the first direction or the second direction.

3. The automatic guided vehicle of claim 1,
wherein the set of passive rotational elements are disposed at the second side of the at least one guiding plate to support the pallet.

4. The automatic guided vehicle of claim 1, wherein the drive equipment is operable to:
drive the automatic guided vehicle to travel at a reduced velocity when the automatic guided vehicle is approaching the receiving station, and drive the automatic guided vehicle to stop at a stop position near the receiving station.

5. The automatic guided vehicle of claim 1, wherein the drive equipment is operable to:
drive the automatic guided vehicle to adjust a positioning of the automatic guided vehicle relative to the receiving station when the automatic guided vehicle stops near the receiving station; and
wherein the at least one retractable engagement member is operable to be in the retracted status after the positioning has been adjusted.

6. The automatic guided vehicle of claim 1, wherein the first direction and the second direction are perpendicular to an extending direction of the guiding line.

7. A conveying system, comprising:
a receiving station comprising:
a frame;
a linear drive equipment comprising:
a shaft comprising a first end and a second end, and
a motor drive unit disposed at the first end of the shaft, wherein the motor drive unit is a linear actuator configured to create motion in a straight line to move a carriage along the shaft; and
the carriage movably disposed on the shaft, the carriage adapted to hook the pallet at the second end of the shaft;
wherein the linear drive equipment is configured to be operable to move the carriage in a first direction along a length of the shaft from the second end of the shaft to the first end of the shaft or move the carriage in a second direction along the length of the shaft opposite to the first direction from the first end of the shaft to the second end of the shaft;
an automatic guided vehicle comprising:
a drive equipment operable to drive the automatic guided vehicle to travel and stop along a guiding line,
a first sensor configured to detect a stop command point along the guiding line to facilitate a first positioning of the automatic guided vehicle along the guiding line, and
a second sensor configured to facilitate a second positioning of the automatic guided vehicle along the guiding line and relative to the receiving station after stopping at the stop command point along the guiding line,
wherein the automatic guided vehicle is configured to travel and stop along the guiding line and next to the receiving station; and
a pallet,
wherein the automatic guided vehicle is configured to travel and stop along the guiding line and next to the receiving station with the pallet and deliver the pallet to the receiving station,
wherein the automatic guided vehicle is configured to receive the pallet from the receiving station and travel and stop at one or more other locations along the guiding line with the pallet;
wherein, when the automatic guided vehicle travels along the guiding line with the pallet, at least one retractable engagement member of the automatic guided vehicle is configured to be placed in an extended status to retain the pallet on the automatic guided vehicle;
wherein, when the automatic guided vehicle is stopped near the receiving station with the pallet, the at least one retractable engagement member of the automatic guided vehicle is configured to be placed in a retracted status, and the receiving station is configured to hook the pallet to move the pallet in a first direction to load the pallet from the automatic guided vehicle and onto the receiving station, or to move the pallet in a second direction to unload the pallet from the receiving station and onto the automatic guided vehicle.

8. The conveying system of claim 7, wherein the pallet comprises:

a hooking mechanism adapted to hook a carriage of the receiving station, wherein a width of the hooking mechanism is less than a width of the pallet.

9. The conveying system of claim 8, wherein the hooking mechanism is configured to engage the carriage of the receiving station, and wherein the hooking mechanism is arranged on the pallet so as to avoid blocking a movement of the pallet being carried onto the receiving station by the carriage.

10. The conveying system of claim 8, wherein the pallet further comprises:

at least one guiding plate, wherein the at least one guiding plate is configured to facilitate guiding the loading or the unloading of the pallet between the receiving station and the automatic guided vehicle by engaging a set of rotational guiding elements of the automatic guided vehicle.

11. A method for conveyance control comprising:

causing drive equipment of an automatic guided vehicle to, based on inputs from a first sensor of the automatic guided vehicle, travel along a guiding line and stop at a stop command point near a receiving station;

after stopping at the stop command point, refining, based on inputs from a second sensor of the automatic guided vehicle, a positioning of the automatic guided vehicle relative to the receiving station:

causing at least one retractable engagement member of the automatic guided vehicle to be in a retracted status when the automatic guided vehicle stops near the receiving station; and causing linear drive equipment of the receiving station to move a carriage that hooks a pallet in a first direction along a shaft away from the automatic guided vehicle to load the pallet from the automatic guided vehicle onto the receiving station, or move the carriage in a second direction along a length of the shaft opposite to the first direction towards the automatic guided vehicle to unload the pallet from the receiving station and onto the automatic guided vehicle.

12. The method of claim 11, further comprising:

causing at least two retractable engagement members of the receiving station to be in an extended status to engage with the pallet when the pallet is carried on the receiving station and the carriage is stationary and causing the at least two retractable engagement members to be in the retracted status to disengage from the pallet before the carriage is moved.

* * * * *